April 21, 1925.
A. E. OSTRANDER
1,534,137
TANK CAR VALVE OPERATING MECHANISM
Filed Feb. 19, 1921  2 Sheets-Sheet 1
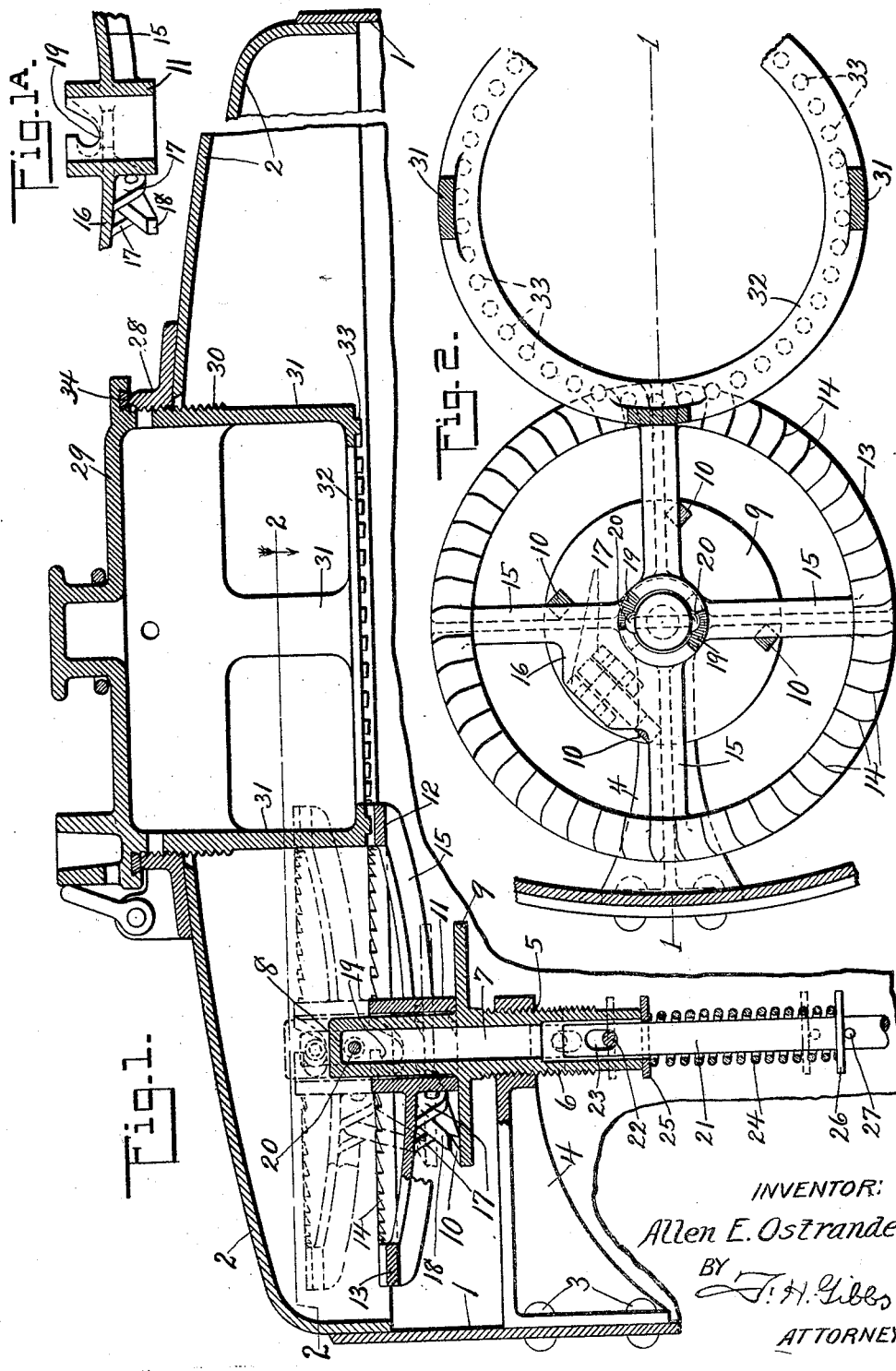
INVENTOR:
Allen E. Ostrander
BY
J. H. Gibbs
ATTORNEY.

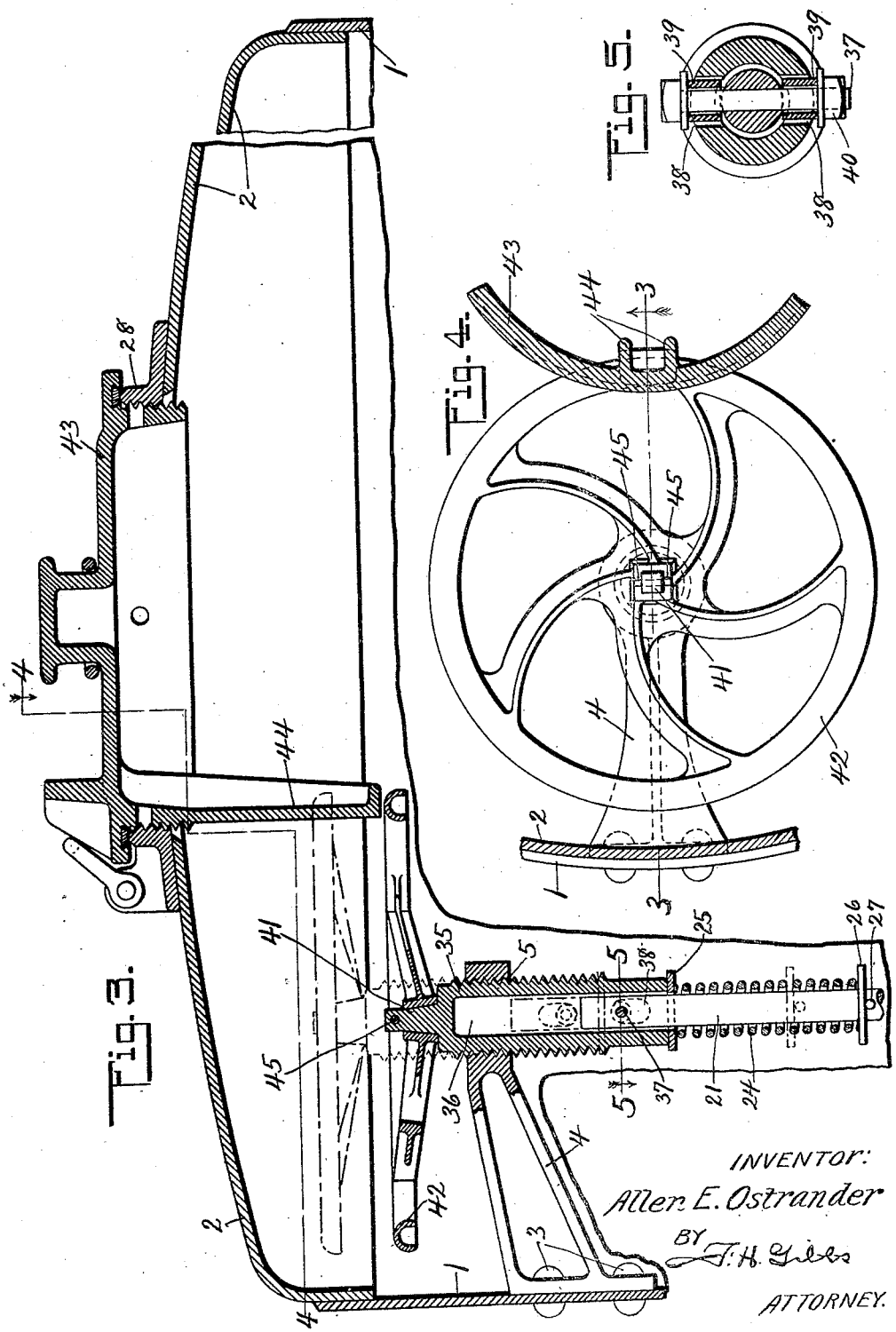

Patented Apr. 21, 1925.

1,534,137

UNITED STATES PATENT OFFICE.

ALLEN E. OSTRANDER, OF RIDGEWOOD, NEW JERSEY, ASSIGNOR TO AMERICAN CAR AND FOUNDRY COMPANY, OF ST. LOUIS, MISSOURI, A CORPORATION OF NEW JERSEY.

TANK-CAR VALVE-OPERATING MECHANISM.

Application filed February 19, 1921. Serial No. 446,294.

*To all whom it may concern:*

Be it known that I, ALLEN E. OSTRANDER, residing at Ridgewood, in the county of Bergen and State of New Jersey, and being a citizen of the United States, have invented certain new and useful Improvements in a Tank-Car Valve-Operating Mechanism, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figure 1 is a view in section of my improved tank car valve operating mechanism and manhole cover;

Figure 1ª is a view in section of a fragmentary portion of the operating mechanism;

Figure 2 is a section taken on the line 2—2 of Fig. 1;

Figure 3 is a section of a modified form of my device;

Figure 4 is a section taken on the line 4—4 of Fig. 3; and

Figure 5 is a section taken on the line 5—5 of Fig. 3.

It is an object of my invention to provide an improved tank car valve operating mechanism and manhole cover so related that the manhole cover cannot be properly positioned on its seat to close the tank opening unless the tank discharge valve has been properly seated and it is also an object of my invention to provide a means whereby if the tank discharge valve is not properly seated it will be properly seated by the seating of the manhole cover and it is also an object of my invention to have such valve seating means permit of the unseating of the manhole cover without unseating the tank discharge valve.

In the drawings, 1 designates the dome sheet of the usual tank car dome having a dome head 2 secured thereto in the usual manner. Secured to the sheet 1 by rivets 3 is a bracket 4 having a screw threaded opening 5 in which is mounted a screw threaded sleeve 6. The sleeve 6 is provided with a cylindrical bore 7, closed at one end by the wall 8 and of slightly greater diameter for a portion of its length at the other or open end. About midway of its length, the sleeve 6 is provided with a disk-like collar 9 having a plurality of wedge-shaped blocks 10 projecting from its upper face. Sleeved about the sleeve 6 and resting upon the collar 9 is the hub 11 of the hand wheel 12 having spokes 15 connecting the hub 11 to a rim 13 provided with gear teeth 14.

Two of the spokes 15 are joined, for a part of their length, by a web 16 having spaced lugs 17 on the under face thereof and a gravity operated pawl 18 pivotally mounted between the lugs 17, the pawl 18 being designed to engage with the projections 10 to cause the sleeve 6 to rotate with the hand wheel 12 when the hand wheel 12 is rotated in one direction and to ride over the projections 10 and not operate the sleeve 6 when the hand wheel 12 is rotated in the opposite direction. To rotate the sleeve 6 in the opposite direction, the hub 11 of the hand wheel 12 is provided with undercut slots 19 in its upper end adapted to engage the heads of the rivet 20 in the upper end of the sleeve 6.

Into the enlarged portion of the bore 7 in the sleeve 6 is inserted the upper end of the valve rod 21, the rod 21 having a limited movement in the bore 7 determined by the engagement of the pin 22, mounted in the sleeve 6, with the ends of the slot 23 in the rod 21. A spring 24 surrounds the rod 21 and is confined between washer 25 which bears against the sleeve 6 and washer 26 which bears against a pin 27 mounted in the rod 21.

Secured to the dome head 2 so as to surround the manhole opening is a flanged collar 28 having a screw threaded opening in which is mounted the manhole cover 29. The cover has the screw threaded flange 30 adapted to engage with the collar 28 and the flange 30 is provided with a plurality of extensions 31 joined by an annular rim 32 provided with teeth 33 adapted to engage with the teeth 14 of the hand wheel 12.

Assuming the discharge valve closed and the manhole cover 29 in place, rotating the manhole cover 29 to remove it will cause the hand wheel 12 to rotate carrying with it the pawl 18 which will ride idly over the projections 10 on the collar 9. The manhole cover 29 having been removed, the valve is operated by sliding the hub 11 of the hand wheel 12 along the sleeve 6 and rotating it in a clockwise direction, as shown in Fig. 2, until the heads of the rivet 20 are engaged in the undercut slots 19 in the sleeve 6. Continued rotation of the hand wheel 12 in a clockwise direction will then rotate the sleeve 6 in the bracket 4 causing the sleeve 6 to be elevated and moving the pin 22 in the slot 23 as well as rotating the rod 21 and the valve on its seat. The spring 24 helps to hold the valve to its seat until the pin 22 engages the upper end of the slot 23, when the valve will be lifted and the discharge port opened.

If the manhole cover is replaced and the discharge valve has not been closed, after the cover 29 has been screwed part way down, the teeth 33 on the rim 32 will engage with the teeth 14 on the rim 13 of the hand wheel and will rotate the hand wheel 12 in a counter-clockwise direction. Rotation in this direction will disengage the slots 19 from the heads of the rivet 20 and permit the hub 11 to slide on the sleeve 6 until it engages the collar 9. This may cause the teeth 14 and 33 to become separated, but continued rotation of the manhole cover 29 will cause the teeth 14 and 33 to reengage and rotate the hand wheel 12 on the sleeve 6 until the pawl 18 engages with one of the projections 10. Thereafter the sleeve 6 will rotate with the hand wheel 12 and be lowered in the bracket 4 thus lowering the rod until the valve engages the cover 29 until seat. Further rotation of the cover 29 until the packing 34 engages the collar 28 will cause the hand wheel 12 and sleeve 6 to rotate, rotating the valve upon its seat and causing the sleeve 6 to be lowered in the bracket 4 until the pin 22 engages the bottom of the slot 23. As the sleeve 6 is lowered, the spring 24 will be compressed and the valve forced to its seat under a gradually increased pressure.

In the modified structure shown in Figs. 3, 4 and 5, the dome sheet 1 carries the dome head 2 having the usual flanged collar 28 surrounding the manhole opening in the dome head 2. Secured to the dome sheet 1 by the rivets 3 is the bracket 4 having the screw threaded opening 5 therein. Mounted in the opening 5 is the screw threaded sleeve 35 having a cylindrical bore 36 that extends the greater part of the length of the sleeve 35. Slidably mounted in the bore 36 is the valve rod 21 carrying a pin 37 that travels in slots 38 in the sleeve 35. The pin 37 is provided with cylindrical bushings 39 where it engages the slots 38 and is held in position by the nut 40. Surrounding the rod 21 is the spring 24 confined between the washer 25, which bears against the lower end of the sleeve 35, and the washer 26 which bears against the pin 27 mounted in the rod 21.

The upper end of the sleeve 35 is provided with a pyramidal extension 41 upon which is mounted a hand wheel 42 of the usual type retained in place by the pin 45 in the extension 41. Operation of the hand wheel in one direction will raise the sleeve 35 in the opening 5 in the bracket 4 the valve being rotated upon its seat until the pin 37 engages the end of the slot 38, whereupon the valve is raised from its seat. Rotating the hand wheel in the opposite direction will lower the sleeve 35 in the bracket opening 5, rotating the valve and bringing the valve to its seat. Continued rotation of the wheel will compress the spring 24 and force the valve to its seat under a gradually increasing presure until the pin 37 engages the end of the slot 38.

Screwed into the opening in the flanged collar 28 is the manhole cover 43 provided with an integral projecting lug or finger 44. The projection 44 is of such length that there is sufficient clearance to permit of the cover 43 being properly seated when the valve is seated and the sleeve 35 lowered to the limit of its movement. If the sleeve 35 is not properly positioned the projection 44 will engage with the hand wheel 42 and prevent the manhole cover 43 being properly seated upon the collar 28.

What I claim is:

1. In a tank car, a valve operating mechanism comprising a hand wheel, a manhole cover and means carried by said cover adapted to engage said hand wheel.

2. In a tank car, a valve operating mechanism comprising a hand wheel, a manhole cover and a projection on said manhole cover adapted to engage with said hand wheel when the valve is open.

3. In a tank car, a valve operating mechanism comprising a hand wheel, a manhole cover and means carried by said cover adapted to operate said hand wheel upon rotation of said cover.

4. In a tank car, a valve operating mechanism comprising a hand wheel, gear teeth on said hand wheel, a manhole cover and gear teeth carried by said manhole cover adapted to engage with the teeth on said hand wheel to operate said hand wheel.

5. In a tank car, a valve operating mechanism comprising a sleeve, a hand wheel journaled on said sleeve and adapted to operate said sleeve, a manhole cover and means carried by said cover adapted to operate said hand wheel.

6. In a tank car, a valve operating mechanism comprising a sleeve, a hand wheel journaled on said sleeve, a pawl and ratchet connection between said hand wheel and said sleeve, a manhole cover and means carried by said cover adapted to operate said hand wheel.

7. In a tank car, a valve operating mechanism comprising a sleeve, a hand wheel, means adapted to connect said hand wheel and said sleeve for rotation in one direction, means adapted to connect said hand wheel and said sleeve for rotation in the opposite direction a valve operating rod operated by said sleeve and connection between said sleeve and rod permitting relative longitudinal movements of said sleeve and rod.

8. In a tank car, a valve operating mechanism comprising a sleeve, a hand wheel, means adapted to automatically connect said hand wheel and said sleeve for rotation in one direction and means adapted to connect said hand wheel and said sleeve for rotation in the opposite direction when said hand wheel is shifted upon said sleeve.

9. In a tank car, a valve operating mechanism comprising a sleeve, a hand wheel journaled on said sleeve, a pawl and ratchet adapted to connect said hand wheel and said sleeve when said hand wheel is rotated in one direction and a pin and slot connection for said hand wheel and said sleeve when said hand wheel is rotated in the other direction.

10. In a tank car, a valve operating mechanism comprising a sleeve, a hand wheel and means adapted to connect said hand wheel to said sleeve for rotation in both directions, said means being adapted to disconnect said hand wheel from said sleeve upon reversal of the direction of rotation.

11. In a tank car, a valve operating mechanism and a manhole cover adapted to be threaded on said tank and to rotate said operating mechanism to seat the valve during the seating of the cover.

12. In a tank car, a valve operating mechanism, a manhole cover and gear teeth on said mechanism and said cover adapted to mesh to operate the valve during the seating of the cover.

13. In a tank car, a longitudinally movable valve operating mechanism, rotatable means to operate said valve operating means and a manhole cover adapted to operate said rotatable means to seat the valve during the seating of the cover, said valve operating means being adapted to hold said valve to its seat upon the removal of said cover.

14. In a tank car, a valve operating mechanism comprising a hand wheel adapted to operate the valve and a manhole cover adapted to operate the hand wheel to rotate the valve and to gradually vary the pressure exerted upon the valve.

15. In a tank car, a valve operating mechanism comprising a bracket having an opening, a sleeve adapted to engage said opening, a valve rod having a pin and slot connection with said sleeve, a hand wheel adapted to operate said sleeve and a manhole cover adapted to operate said hand wheel.

16. In a tank car, a valve operating mechanism comprising a bracket, a sleeve adjustably mounted in said bracket, sleeve operating means carried by said sleeve, and a valve rod having a pin and slot connection with said sleeve adapted to be rotated by rotation of said sleeve.

17. In a tank car, a valve operating mechanism comprising a bracket, a sleeve rotatably mounted in said bracket, means to operate said sleeve rotatably mounted on said sleeve, a valve rod and a connection between said sleeve and valve rod adapted to cause the valve rod to rotate with said sleeve and to permit the sleeve to move longitudinally of said rod.

18. In a tank car, a valve operating mechanism comprising a bracket, a sleeve adapted to be adjusted longitudinally in said bracket, sleeve operating means loosely mounted on said sleeve, a valve rod rotated by said sleeve and a connection between said sleeve and rod permitting predetermined independent longitudinal movements of said sleeve and valve rod.

19. In a tank car, a dome, a valve operating mechanism comprising a bracket carried by said dome, a sleeve threaded in an opening in said bracket, means to rotate said sleeve and a valve rod, operated by rotation of said sleeve, adapted to be rotated by the initial movement of said sleeve and to be rotated and moved longitudinally upon the continued rotation of said sleeve.

20. In a tank car, a dome, a valve operating mechanism comprising a bracket carried by said dome, a sleeve mounted in said bracket, means to operate said sleeve, a valve rod rotated by said sleeve, a pin and slot connection between said valve rod and sleeve and a spring tending to separate said valve rod and sleeve.

21. In a tank car, a tank having discharge and manhole openings, a valve for said discharge opening, operating means for said valve, a cover for said manhole opening, and means on said cover to project into said tank and engage with said valve operating means when said valve is in open position.

22. In a tank car, a tank having discharge and manhole openings, a valve for said discharge opening, operating means for said valve, a cover for said manhole opening, and means projecting from said cover to engage with said operating mechanism when said valve is in open position.

23. In a tank car, a tank having discharge and manhole openings, a valve for said discharge opening, operating means for said valve, a cover for said manhole opening, and means within said tank and operated by said cover to engage said valve-operating mechanism when said valve is in open position.

In witness whereof I have hereunto set my hand in the presence of two witnesses.

ALLEN E. OSTRANDER.

Witnesses:
 HERBERT J. WAHL,
 BESSIE D. STRONG.